Figure 4:
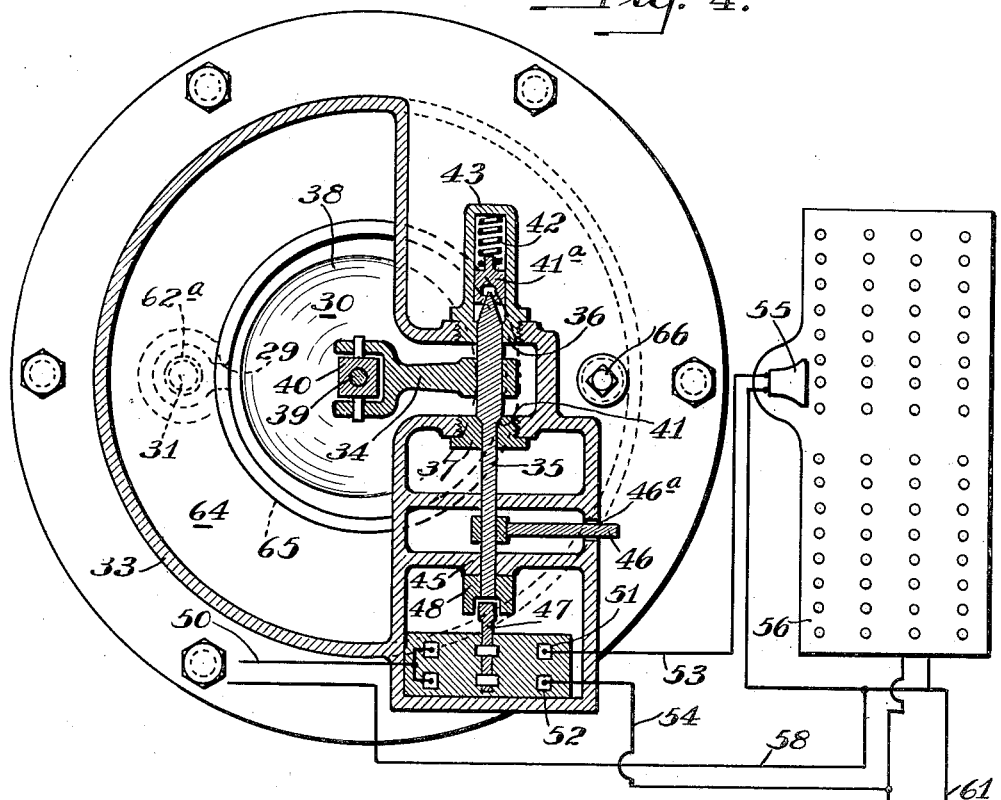

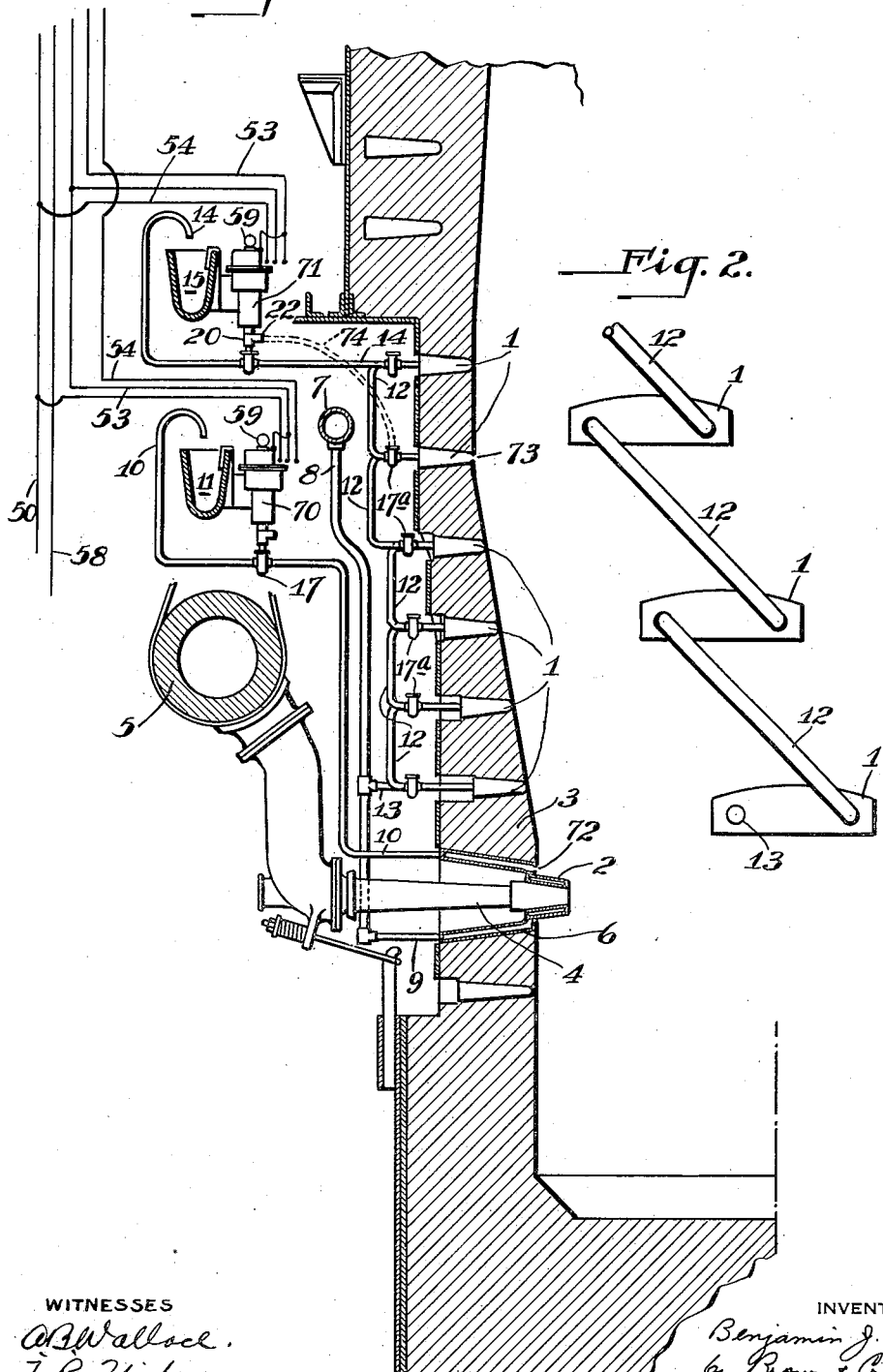

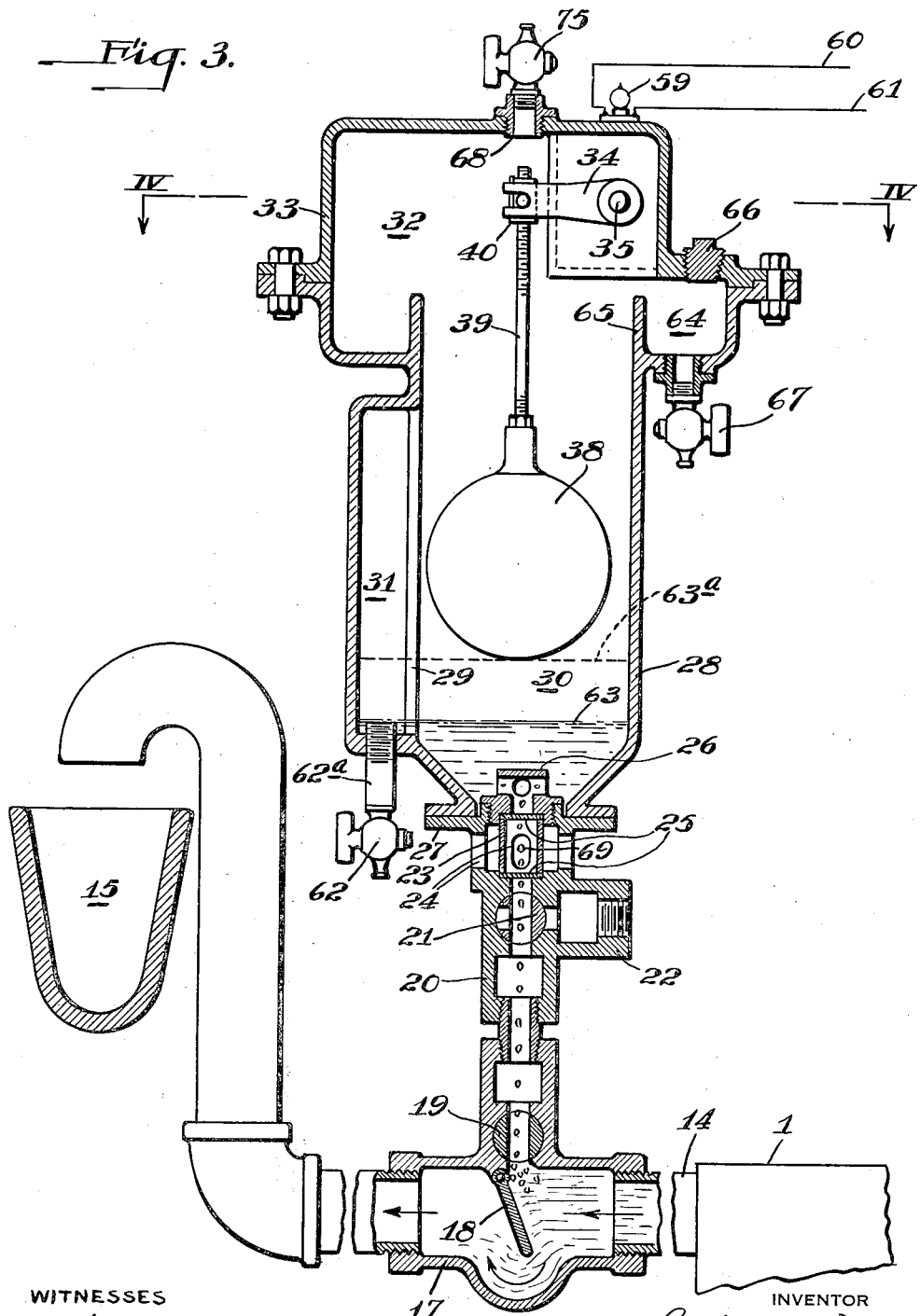

June 27, 1933. B. J. MULLEN 1,915,576
APPARATUS FOR DETECTING LEAKS IN A COOLING SYSTEM
Filed Dec. 19, 1928 4 Sheets-Sheet 3

WITNESSES
INVENTOR

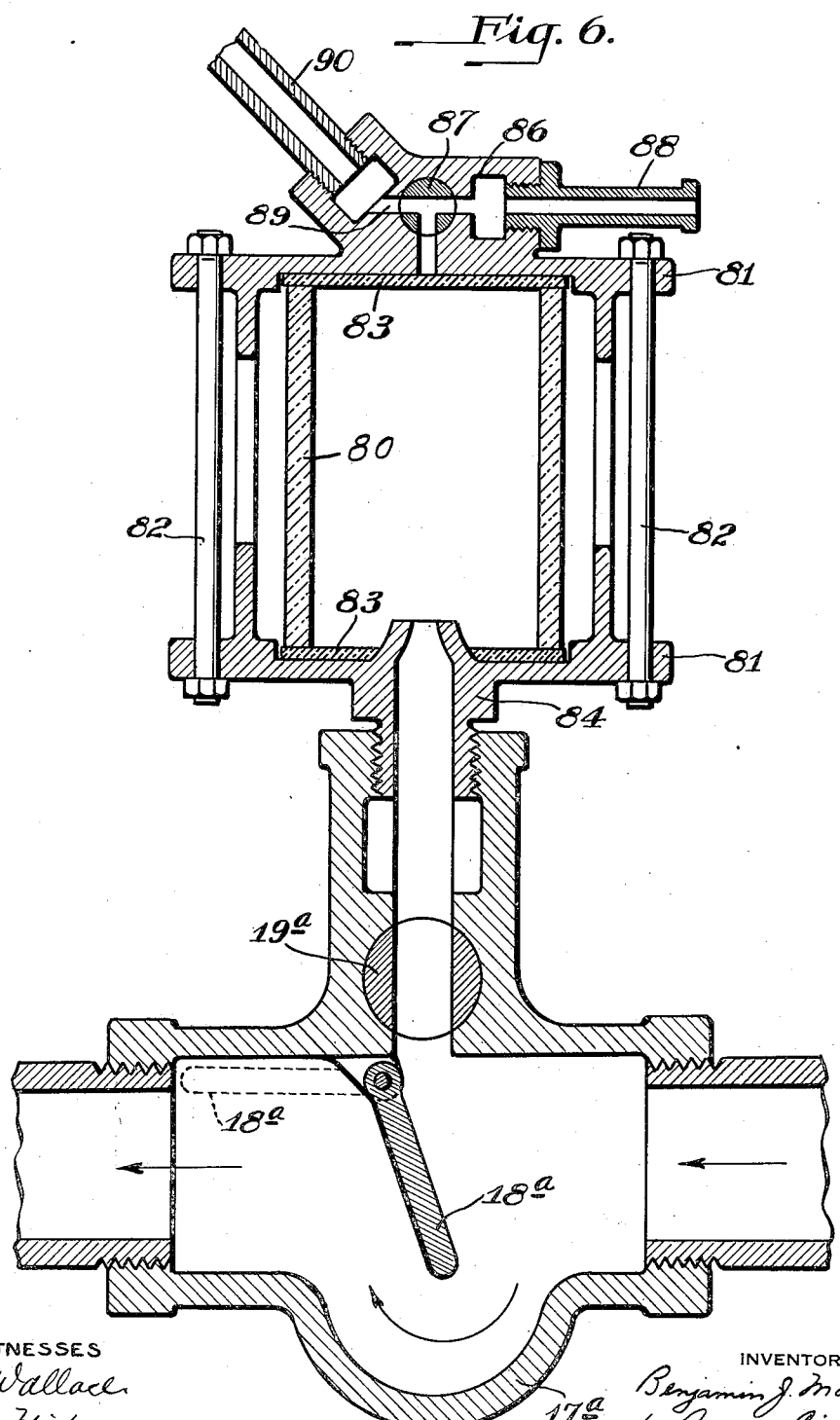

Patented June 27, 1933

1,915,576

UNITED STATES PATENT OFFICE

BENJAMIN J. MULLEN, OF COLUMBIANA, OHIO

APPARATUS FOR DETECTING LEAKS IN A COOLING SYSTEM

Application filed December 19, 1928. Serial No. 327,008.

This invention relates to the detection of abnormal conditions in combustion unit cooling systems, and especially to means for indicating leakage in blast furnace cooling elements. The serious consequences of leakage of combustion unit liquid-circulation cooling systems has been overcome in part by maintaining the heat-absorbing liquid at a pressure less than that normally presented by the gas in the combustion unit. For example, the modern practice is to supply the bosh plates, tuyère coolers and similar liquid circulation cooling elements used in blast furnaces with water at a pressure below that of the gas in the furnace, so that water does not enter the furnace in case of perforation of the cooling elements. This method of preventing leakage, however, is effective only for relatively small leaks, and while the pressure relations are maintained. Thus, during casting the gas pressure is reduced, and water may then pass into the furnace from a leaky element. The chilling of the furnace and other serious disadvantages attendant upon such leakage are well known, but it is recognized that elements may leak for some time before the fact becomes evident, and generally a leaky element can be located only with great difficulty, especially when the leak is small. For example, externally visible seepage may appear only at a considerable distance from the perforated element.

Up to the present, leaky elements have been located empirically, there being available no means for quickly and certainly identifying such elements, and in consequence small leaks may escape detection and ultimately be productive of serious or expensive consequences. Other abnormal conditions may also occur which, unless quickly detected, are productive of damage. For example, the cooling elements or water supply pipes may become clogged so as not to receive sufficient water, and if this condition is not quickly remedied the elements may be burned out. However, the only means available for detecting this disturbance in operation is by observation of the volume of water leaving the discharge line, and it is apparent that an operator cannot constantly watch for this type of trouble.

An object of the invention is to provide means for indicating presence of abnormal conditions in combustion unit cooling systems.

Another object is to provide simple and durable means for use with a blast furnace cooling unit to indicate leakage or other disturbance in operation in any part of the unit.

A further object is to provide fluid-pressure operated means for signalling leakage in a blast furnace cooling unit supplied with cooling liquid at a pressure below that of the furnace, which means are compact, automatic in operation, and do not necessitate any modification of existing cooling systems in being applied thereto.

Still another object is to provide fluid pressure operated means of the type referred to adapted to signal leakage in any part of a multiple-element cooling unit and adapted to thereafter locate the faulty elements.

Among others, it is also an object of the invention to provide portable leak-detecting means for use in locating leaks in the individual elements of a cooling system.

Figure 5:
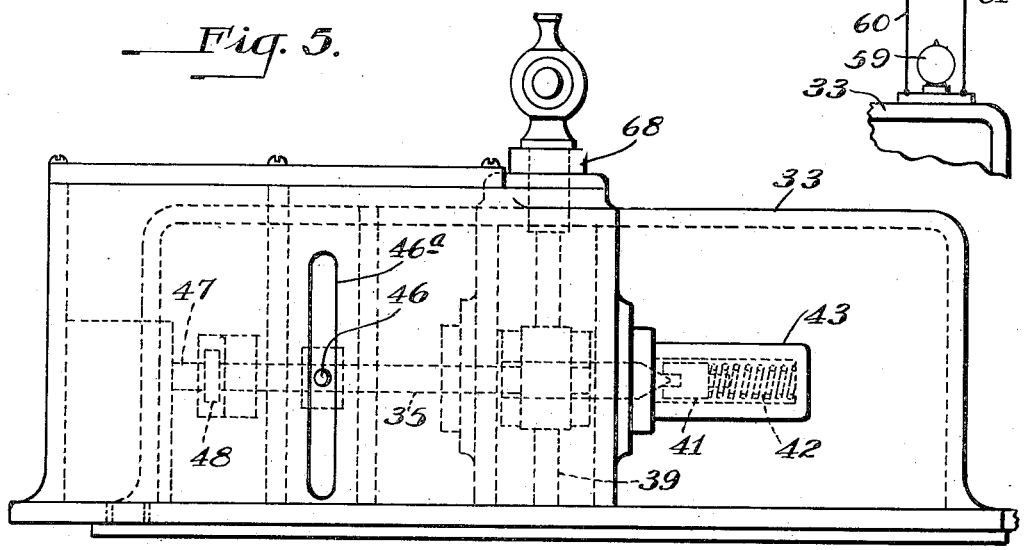

The invention is illustrated in the accompanying drawings, in which Fig. 1 is a fragmentary vertical section through the hearth and bosh portions of a blast furnace showing cooling elements equipped in accordance with the invention; Fig. 2 a fragmentary elevation of the bosh portion of a blast furnace showing the manner of connecting the elements of a bosh plate unit; Fig. 3 a vertical section of a leak detector and diagrammatic representation of signalling means used therewith; Fig. 4 a horizontal section taken on line IV—IV, Fig. 3; Fig. 5 a side elevation of the upper portion of the apparatus shown in Fig. 3; and Fig. 6 a vertical section through a modified leak detecting apparatus adapted particularly for portable use.

According to this invention, leakage or other abnormal conditions in the cooling system of a combustion unit is indicated by means associated with the unit or units comprising the cooling system, and preferably by means responsive to variations in pressure effected therein by such disturbances in operation.

In the preferred embodiment the apparatus comprises a pressure chamber, means connected to the cooling unit water supply to create fluid pressure in the chamber, and mechanism operatively connected to any suitable signalling means and movable in response to changes in pressure induced by abnormal conditions to actuate the signalling means. The change in fluid pressure may be caused by interference with the water supply, in which case the apparatus may be connected either to the unit intake or to the discharge line; or the pressure change in the apparatus may result from gas leakage into the unit, in which case the apparatus is connected to the discharge from the unit, and in this case, the apparatus also signals interference with the water supply. The leak detector provided by the invention is applicable to units comprising one or a multiplicity of cooling elements, or to a plurality of units of either type. Also, any type of signal may be used, audible or visible, and mechanically or electrically operated.

Where the apparatus is applied to the discharge from a multiple-element unit, leakage in any part of the unit is automatically indicated, and each element of the unit may also be provided with means for locating which element is defective when the unit as a whole is thus indicated as faulty. To this end the discharge of each element may be provided with supplementary means for signalling through the main apparatus, which most suitably comprises means for creating pressure in the apparatus by the discharge from each element individually, only the faulty element then effecting an alarm. Independent means may also be used to locate the defective element in a unit indicated as being faulty, in which case there may be used a portable gas leakage indicator also provided by the invention. This means comprises an apparatus adapted to be readily connected to the water discharge lines for separating from the discharge water and visibly collecting any gas leaking into the element under observation.

The invention may be better understood by reference to the drawings, which show the invention as applied to a blast furnace, to which use the invention is especially adapted. In Fig. 1 the customary bosh plates 1 and a tuyère 2 are shown disposed in the usual manner in the refractory wall 3, and surrounding the blow pipe 4 connecting the tuyère and bustle pipe 5 is a tuyère cooler 6. Water from a main 7 passes through a pipe 8 and intake 9 to tuyère cooler 6, and is discharged through an outlet 10 to a collecting trough 11 surrounding the furnace, which serves all of the tuyère coolers, each tuyère cooler comprising a separate cooling unit. The outlet 12 from each of a vertical series of bosh plates is connected to the inlet of the next higher plate, as shown in Figs. 1 and 2, and water supplied to the lowermost plate through a branch 13 from pipe 8 circulates progressively through the plates, and is finally discharged through pipe 14 into a collecting trough 15. This manner of connecting vertically disposed bosh plates provides bosh cooling units each of which comprises a plurality of individual elements. The water supply line of each bosh, tuyère or other cooling unit is provided with means for indicating abnormal conditions in the unit, and preferably the means shown in Figs. 3 to 5.

The preferred indicating means provided by the invention comprises a T-fitting 17 having a deflecting plate 18 rotatably mounted in the run, and a valve 19 in the side arm. The run is suitably threaded for insertion in the water line of the cooling unit, and the side arm is connected to a second T-fitting 20 having a three-way valve 21 for controlling flow through the run and side arm 22. Fitting 20 is recessed at one end to receive a glass tube 23 visible through ports 24 formed in the fitting and held in place between gaskets 25 by a deflecting cap 26 threaded into a flange 27 formed on the end of the fitting. Disposed over the cap and connected to flange 27 is a casing 28 which comprises a lower portion divided by a slotted wall 29 into a float chamber 30 and a regulating well 31, and an upper enlarged portion 32 which forms a compression chamber when a removable head 33 is attached.

The signalling means is preferably actuated by mechanism movable in response to variations of pressure. This mechanism comprises a switch lever 34 keyed to a shaft 35 mounted in bearings 36 and 37, (Fig. 4), and a float 38 suspended by a threaded float rod 39 from a sleeve 40 pivotally mounted in the bifurcated end of lever 34. Shaft 35 is ground to fit a tapered seat 41 formed in bearing 37, and the adjacent end of the shaft is tapered to seat in a block 41a urged against the end of the shaft by a spring 42 held in a casing 43, the thrust thus set up making a gas-tight connection between the shaft and bearing 37. The shaft is supported at its other end in a bearing 45 formed in the cap, and an indicator arm 46 connected to the shaft intermediate its ends for rotation therewith extends through a slot 46a formed in the cap.

In a manner presently to be described, this mechanism actuates a signal, electrical signals being preferably used. As here shown, a key 47 of a double-pole snap switch (Fig. 4) is connected to the free end of shaft 35 by a coupling 48 of any suitable type. Both terminals of one side of the switch are connected by a lead 50 to a power supply, and on the other side terminals 51 and 52 are connected by leads 53 and 54 to a horn 55 and a lamp panel 56, respectively, these circuits being completed by a return lead 58 to the main circuit. A signal lamp 59 mounted on head 33 is also connected in these circuits, for example by leads 60 and 61 from the panel circuit.

In the use of this apparatus to signal interference with water supply or leakage of the cooling units, the apparatus is adjusted so as to keep the switch circuit open under normal operating conditions and to give a signal promptly upon the occurrence of abnormal conditions. This is accomplished by adjustment of the compression space to the line pressure in the following manner. Valve 19 is closed, valve 21 turned to open the line from fitting 17 to the float chamber and close branch 22, and a pet cock 62, connected to an overflow pipe 62a threaded into regulating chamber 31, is opened. Valve 19 is now opened and water from the line rises in the float and regulating chambers, and when equilibrium is reached valve 19 is closed and the water allowed to drain to the level of pipe 62a, when the pet cock is opened. The air in the apparatus is now at atmospheric pressure, and the water level 63 obtained by this primary adjustment is dependent upon the variable height of pipe 62a in chamber 31. Valve 19 is now reopened, and the head of the water in the line forces water into the float chamber to raise the float and compress the air above it until the air pressure balances the water pressure.

The primary adjustment of the water level should be such that the float will be raised to open circuit position when line pressure is applied, and such that it will be moved enough to operate the signal mechanism when the operation of the unit is faulty, but so that it will not actuate the signal mechanism in response to movement caused by normal fluctuation of line pressure. This condition will not be attained if the air space given by the primary adjustment is too great or too small, because then the float will be raised to a position such that the slight variations in movement caused by normal changes in line pressure will prematurely operate the switch and signal means. For these reasons water level 63 should be so regulated as to keep the circuit open under normal operation, and to permit switch actuation promptly when conditions require an alarm to be given.

This adjustment of water level 63 may be made by means of a compensating chamber 64 formed by extending the wall 65 of the float chamber into the compression chamber, water or other liquid, or metal shot being introduced into this channel through an opening closed by a plug 66, or drained from it through a pet cock 67 to decrease or increase the air space above the water in the float chamber, as the case may be, so that line pressure properly suspends the float in the manner just described. Fine adjustment may also be made by raising or lowering pipe 62a in chamber 31, the pipe being threaded for that purpose, and the vertical height of float 38 may be changed by varying the position of threaded rod 39 in sleeve 40. For this purpose the end of the rod is slotted to receive a screw driver which may be inserted through an opening in cap 33 normally closed by a threaded plug 68. These adjusting means are also adapted to make the apparatus applicable to units carrying water at various pressures, so that one size of apparatus may be used for all units.

As has been stated, the apparatus may be used to indicate abnormal conditions of the water supply, or gas leakage of a cooling element, or it may be used for both purposes. When used purely to detect faulty water supply, it may be inserted either in the intake or in the discharge line of the unit, but preferably it is placed in the discharge line, in which position it also acts as a leak detector. Except for not indicating leakage when disposed in the intake, the operation is the same in either position, and will be described with reference to its combined use.

After being adjusted to the line pressure from the unit in the manner previously described, the float stays in open-circuit position as long as the pressure of the water in the discharge line is normal or subject only to the fluctuations usually incident to operation, this normal level being indicated by a dotted line 63a. Should the water supply fall off, or fail completely, the decreased line pressure permits the air in the apparatus to expand, the float lowers and shaft 35 rocks until the water level has fallen to a predetermined position, when the switch is operated to close the horn and lamp circuits. The horn then sounds, calling attention to the lamp panel, and the lamp carried by the apparatus is lighted. It is usually desirable to set the mechanism to give an alarm before water is completely off the unit, in order to allow time to remedy the trouble before damage occurs due to lack of water.

When used also to detect perforation and leakage of an element or unit, deflector plate 18 is turned so that the water impinges against it, as shown in Fig. 3. In this case, when a leak occurs in the cooling unit gas from the furnace enters the unit and is carried along by the water until it strikes deflector 18, which separates the gas and directs it upwardly, as indicated by bubbles 69, through fitting 20 and cap 26 into the float chamber, from which it is released into the air space above the water. Cap 26 preferably is formed to direct the gas bubbles laterally to prevent disturbance of the float by a stream of gas bubbles released directly below it. As the gas accumulates, pressure in the compression chamber increases, and gradually forces water out of the apparatus back into the line, lowering the float until the signals are operated as before.

Where used as a combined leak detector and water indicator, the operator has no difficulty in determining the cause of trouble when an alarm is given by the apparatus. If the unit is leaking, gas bubbles 69 are visible through ports 24, and observation of the water discharged into the collecting trough shows no diminution from normal. On the other hand, if the unit is not getting sufficient water, this is shown by decrease in discharge to the trough, and substantial absence of gas bubbles in the glass. Accordingly, the operator can quickly recognize the cause of the alarm and take steps to remedy it immediately.

In the use of the invention with blast furnace cooling systems, the discharge pipe 10 from each tuyère and discharge 14 from each bosh plate unit is provided with an indicator, as shown at 70 and 71, respectively, Fig. 1, and other cooling units, such as for the cinder notch and the like, may be similarly equipped. The horn and light panel leads 53 and 54 from each apparatus are taken to a common horn 55 mounted on panel 56 which is provided with a separate light for each unit as indicated in Fig. 4. The panel may be adjacent the furnace, or in a remote control room, in which case lamp 59 on each device indicates trouble in its unit to the operator at the same time that a signal is given in the control room. Upon the occurrence of a leak such as that indicated at 72 in tuyère cooler 6, apparatus 70 is actuated in the manner previously described. That is, signal lamp 59 on indicator 70 is lighted and simultaneously the horn signifies trouble and calls attention to the panel where a light identified with this unit indicates it as being faulty.

Similarly, the perforation of any of the bosh plates in a unit, such as at 73, will be announced, but in this case the signal shows only that there is trouble in the unit without identifying the faulty element thereof. While each element may be provided with an indicating apparatus of the type described, the resultant complexity of wiring, and installation cost would be undesirable. Accordingly, simple means are provided for locating the faulty element in such a unit whose indicator has announced trouble, without the disadvantages mentioned.

For this purpose the discharge line 12 from each element in a unit is provided with a T-fitting 17a, as shown in the bosh unit of Fig. 1. These fittings are similar to fittings 17, except that as shown in Fig. 6, the deflecting plates are rotatable. That is, where fittings 17 are of cast construction the deflecting plates 18 may be cast integrally with the body in position to intercept and trap gas carried by water passed through the fittings. In the case of fittings 17a the deflecting plates 18a are rotatably mounted, so that in a unit comprising a series of elements the plates may be turned out of the path of the water until the fitting is to be used with a leak detector, and thus not offer resistance to the flow of water. These rotatable deflecting plates may, of course, be used in all of the fittings, if desired. Until the unit indicator has shown occurrence of abnormal conditions in the unit valves 19a of the fittings 17a are closed and the deflecting plates are turned back to the dotted line position shown in Fig. 6 so as not to create resistance to the discharge flow. When the unit indicator gives an alarm showing gas leakage in the unit, valve 19 of fitting 17 is closed, a conduit 74 is connected to branch 22 of fitting 20 and to the side arm of a fitting 17a whose deflecting plate is rotated into the stream of water, and valve 19a is opened, followed by rotation of valve 21 to connect the branch with the float chamber, thus connecting the signalling apparatus directly to a single element. Each element is tested in this manner, connecting the conduit successively to the several fittings 17a of the unit until gas collected by the deflecting plate in the discharge from the leaking element causes the indicator to operate the signals. When located, the element of the unit may then be repaired.

The invention also contemplates the provision of a portable indicating means for locating leaking elements in a unit, or for use in detecting leakage in elements not provided with the automatic indicator. As shown in Fig. 6 this means comprises a transparent tube 80 clamped in a framework comprising plates 81 and clamping bolts 82, suitable gaskets 83 being used to make fluid-tight joints. The lower plate is provided with a nipple 84 threaded for engagement with the branch of fittings 17a (or 17), and the upper plate is provided with a bore 86 leading to a nozzle 88 in which bore there is a valve 87. In the use of this device, nipple 84 is screwed into the fitting, valves 19a and 87 are opened, and when tube 80 has become filled with water, valve 87 is closed. If the cooling element is leaking, gas bubbles deflected by plate 18 rise in the tube, displacing the water.

It is at times desirable to determine the nature of gas leaking from the furnace, and such gas may be collected by attaching a suitable receiver through a rubber tube, now shown, to nozzle 88, and opening valve 87 so that the line pressure will cause water to rise in tube 80 and expel the gas into a receiver connected to the tube. Gas may also be collected from the apparatus of Fig. 3 through a pet cock 75 tapped into plug 68. Also anti-freeze mixture may be introduced through this cock in cold weather, and through the opening closed by plug 66.

If desired, the portable device may also be provided with means for passing water through the tube to the discharge line beyond fitting 17a by providing a branch 89 in bore 86 connected suitably to a conduit 90 for connection to the waste line at any desired point. This modification operates by continuous flow of water through the device, the bubbles rising and passing out of conduit 90. Gas may be collected as before, by closing valve 87.

According to the provisions of the patent statutes, I have explained the principle and operation of my invention, and have illustrated and described what I now consider to represent its best embodiment. However, I desire to have it understood that, within the scope of the appended claim, the invention may be practiced otherwise than as specifically illustrated and described.

I claim:

In a blast furnace, the combination with a cooling unit through which water is circulated continuously at a pressure below that of the gas in the furnace, and a discharge conduit from said unit, of means for indicating abnormalities in flow of water and perforation of said unit, said means comprising a closed compression chamber having an opening in its lower end connected to said discharge conduit, the head of water in the conduit causing the water to partly fill said chamber and apply pressure to air trapped therein, a float member disposed in said chamber for actuation in response to changes of water level in the chamber, indicating mechanism connected to said float for actuation by movements thereof, and a gas-separating baffle disposed in said conduit adjacent said opening for directing gas carried by the water into the chamber, the level of water in said chamber being substantially constant during normal operation of the cooling unit, and said indicating mechanism being actuated by change in water level induced by diminution or increase in flow or by gas entering the unit upon perforation thereof.

In testimony whereof, I sign my name.

BENJAMIN J. MULLEN.